United States Patent
Howack et al.

(10) Patent No.: US 10,530,226 B2
(45) Date of Patent: Jan. 7, 2020

(54) STATOR FOR LINEAR STEPPER MOTOR AND METHOD FOR MAKING THE SAME

(71) Applicant: Johnson Electric S.A., Murten (CH)

(72) Inventors: Gerd Howack, Kreischa (DE); Daniel Gerhard Barthel, Kiel (DE); Andreas Kurtz, Glashütte (DE)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 180 days.

(21) Appl. No.: 15/871,587

(22) Filed: Jan. 15, 2018

(65) Prior Publication Data

US 2018/0226863 A1     Aug. 9, 2018

(30) Foreign Application Priority Data

Feb. 9, 2017   (DE) .................. 10 2017 102 629

(51) Int. Cl.
| | | |
|---|---|---|
| *H02K 41/03* | (2006.01) | |
| *H02K 15/02* | (2006.01) | |
| *F16K 31/04* | (2006.01) | |
| *F16K 31/06* | (2006.01) | |
| *H02K 3/28* | (2006.01) | |
| *H02K 7/08* | (2006.01) | |

(52) U.S. Cl.
CPC .......... *H02K 15/022* (2013.01); *F16K 31/04* (2013.01); *F16K 31/06* (2013.01); *H02K 3/28* (2013.01); *H02K 7/085* (2013.01); *H02K 7/086* (2013.01); *H02K 41/03* (2013.01)

(58) Field of Classification Search
CPC .......... H02K 15/02; H02K 3/28; H02K 41/03; H02K 7/08; H02K 7/085; H02K 15/10; H02K 15/022; H02K 37/24; H02K 7/086; F16K 31/04; F16K 31/06
See application file for complete search history.

(56) References Cited

U.S. PATENT DOCUMENTS

| | | | | |
|---|---|---|---|---|
| 5,137,255 | A * | 8/1992 | Sumida | ..................... F16K 1/48 251/77 |
| 5,247,216 | A * | 9/1993 | Bosman | ................. H02K 1/185 310/49.18 |

(Continued)

OTHER PUBLICATIONS

Christian Richter, "3 Elektromagnetische Schrittantriebe," Hanser, 2002, pp. 109-136, *Carl Hanser Verlag Munchen Wien*.

*Primary Examiner* — Naishadh N Desai

(74) *Attorney, Agent, or Firm* — Muncy, Geissle, Olds & Lowe, P.C.

(57) ABSTRACT

A stator for a linear stepper motor includes four stator sheets and two stator windings. The four stator sheets are oriented towards each other, provided with bent polar arms, and have two inner stator sheets each defining a sheet recess and two outer stator sheets that are arranged in an offset manner. THE four stator sheets are joined into an integral coil body by a stator overmold. One of the stator windings is wound onto the coil body between one inner stator sheet and one outer stator sheet and connected with connector pins. The four stator sheets and the stator overmold including a stator flange and a pin socket are integrally formed such that radial envelope surfaces of the at least four stator sheets are free from the stator overmold. A stator recess inside the stator is arranged centrically in the stator overmold.

9 Claims, 5 Drawing Sheets

(56) References Cited

U.S. PATENT DOCUMENTS

| | | | |
|---|---|---|---|
| 5,598,046 A | 1/1997 | Miyazawa et al. | |
| 2005/0264113 A1* | 12/2005 | Suzuki | F16K 31/04 |
| | | | 310/80 |
| 2009/0140584 A1 | 6/2009 | Ohkawa et al. | |
| 2010/0213776 A1* | 8/2010 | Muller | H02K 5/15 |
| | | | 310/83 |
| 2010/0308671 A1 | 12/2010 | Ryan | |
| 2012/0001500 A1* | 1/2012 | Oh | H02K 3/525 |
| | | | 310/43 |

* cited by examiner

STATOR FOR LINEAR STEPPER MOTOR AND METHOD FOR MAKING THE SAME

CROSS REFERENCE TO RELATED APPLICATIONS

This non-provisional patent application claims priority under 35 U.S.C. § 119(a) from Patent Application No. 102017102629.0 filed in the Federal Republic of Germany on Feb. 9, 2017.

FIELD

The present disclosure relates to a stator for a linear stepper motor and a method for its manufacture.

BACKGROUND

Stators for a linear stepper motor are needed in large numbers so that even minor savings in the manufacturing process have a significant economic impact. There are therefore a large number of different stator designs. Generally, they have ball bearing or plain bearing seats for radial support and for dissipating the radial forces from the rotors. There is a requirement for these stators of linear stepper motors to be able to position an actuating rod as precisely as possible both radially and axially, i.e. specifically the axial play of the spindle relative to the spindle nut and the axial play of the whole spindle in the housing should be as small as possible. Most stators are made from a large number of components, resulting in high overall costs, not least because of long assembly times or labour-intensive operations. With many individual components, the variety of components creates a long dimensional chain which may lead to inaccuracies due to the admissible tolerances of the individual components. For these reasons the air gap between the stator and the rotor is often chosen larger so that the accuracy of the actuating force or the efficiency of the linear stepper drive is reduced.

A generic linear stepper motor is known from DE 103 32 389 A1, where the outer web ends of the actuating rod of this linear drive are of such a length that they can be fitted through corresponding guide cut-outs of the D-side bearing shield. After fitting through, a coupling shank that closes the web ends of the actuating rod is fitted and suitably fixed. The stator is bounded by two bearing shields, where two plain bearings for radial support and two balls for axial support of the spindle are arranged in both bearing shields by means of plain bearing journals of appropriate length. A problem here is the wobbling movement of the bell-shaped rotor induced by the two plain bearings and the precise adjustment of axial play.

According to EP 1 414 636 B1, an electro-mechanical linear drive with electric motor, having a hollow shaft rotor, open at one side, and a spindle shaft in the interior of the hollow shaft rotor, a helical gear converting the rotational movement of the hollow shaft rotor into a linear movement, wherein the rod-shaped end of a sleeve-shaped spindle nut protrudes from the open D-side of the linear drive. The hollow shaft rotor itself is cantilevered in the stator on the D-side of the linear drive and the stator consists of a relatively large number of components.

EP 1 928 074 B1 describes a linear actuator comprising a common motor design in a separate two-piece housing with internal rotor with rotor shaft, a stator with coil, the rotor being radially and axially supported by a bearing on the motor side. Directly following the rotor shaft a threaded shank is formed on which a screw-nut system is arranged for producing a linear movement. This linear displacement unit is designed as a fork shape and consists of a nut portion and a coupling portion for its connection with a unit to be controlled. Furthermore, the motor shaft is axially supported by two balls, the balls bearing against hard stops. Moreover, this design additionally has a spring arranged in a bearing intended to prevent axial play of the rotor shaft with the following spindle. This design is characterised by a large number of components and has a relatively long structure.

Another linear drive with a claw-pole stepper motor is shown in DE 10 2008 054 330 A1, where the motor housing is also a radially split two-piece design. After assembly of the motor components, both motor housing halves can be locked and positioned against each other by means of bayonet joint. In this drive solution, too, the linear motor consists of an elevated number of components. To provide radial support, two radial grooved ball bearings are internally arranged.

DE 10 2005 055 868 B1 describes another threaded drive for a linear servo-motor with a flanged two-piece housing, designed as a very short structure, since the threaded spindle is supported and guided by two ball bearings inside the linear servo-motor. However, this motor also consists of a relatively large number of components, which makes its manufacture unnecessarily costly.

The present disclosure is based on the task to create a novel stator for a linear stepper motor, which is built of few components and which can be manufactured economically in an automated manner.

SUMMARY

A novel stator 1 for a linear stepper motor with several stator sheets, at least one stator winding, at least one pole sheet construction, a housing and terminals includes at least four largely similar or identical stator sheets 2 oriented towards each other and provided with inside bent portions forming polar arms 14. All of or at least the two inner stator sheets 2 abutting against each other have a recess 3. The two inner stator sheets 2 are spaced apart from the outer stator sheets 2. The two inner stator sheets 2 abut against each other. One stator winding 4 is arranged between one inner stator sheet 2 and one outer stator sheet 2. The stator sheets 2 which are press-fitted and fixed on an assembly mandrel 13 are placed in a injection molding tool and are overmolded and insert-molded to form an integral stator overmold 6 such that, besides a coil base body, a stator flange 5 is also formed for connection with a cover. In this process, the radial envelope surfaces of the stator sheets 2 remain overmold-free, i.e. the rims of the stator sheets 2 are sealed by being enclosed by a special shape in the cavity of the injection molding tool so that no plastic material can wet the envelope surfaces of the stator sheets 2. Inside the stator 1, facing the region where the arranged injection point 8 is arranged, a stator recess 7 is centrically formed and arranged by a specific design of an assembly mandrel 13. Later on, a ball is arranged in this stator recess 7 as a bearing for the rotor shaft or a spindle. The coil body is wound using a winding device and the winding is connected with inserted connector pins 12. The connector pins are previously inserted centrally into a pin socket made in the overmolding process or are already positioned in the injection molding tool and fixed and insert-molded while the stator is being overmolded.

The stator overmold 6 is enclosed by a metallic stator sleeve 9 such that a conductive contact results on the envelope surface (i.e. the rim) of the stator sheet 2, where the metallic stator sleeve 9 forms the magnetic return path together with the stator sheets 2. A sleeve opening 10 is formed in the stator sleeve 9, through which a connector boot 11 is fitted and connected with the stator overmold 6 and/or with the metallic stator sleeve 9. Advantageously, the connector pins 12 are arranged inside the connector boot 11 for the electrical terminals of the stator windings 4.

In the method according to the present disclosure for manufacturing a stator for a linear stepper motor by means of an assembly mandrel, an injection molding tool and a winding device, at least four stator sheets 2 are press-fitted and arranged on an assembly mandrel 13 in an offset arrangement relative to each other. The individual stator sheets 2 are firmly fixed on the assembly mandrel 13 by press-fitting the polar arms 14. Then the loaded mandrel 13 is placed in an injection molding tool, whose inner diameter correlates with the outer diameter of the stator sheets 2. By placing them, the stator sheets 2 are axially sealed on their front and rear sides by an annular arrangement of circumferential grooves inside the injection molding tool, whose width is matched to the thickness of the stator sheets 2 and into which the stator sheets 2 protrude during the injection molding process. Generally, they protrude as little as possible into these circumferential grooves, but less than one millimeter depending on their overall size. The depth of the grooves should be such that the cross-section at the groove base of the annular grooves in the cavity of the injection molding tool preferably conforms to the cross-section of the stator sheets 2, so that no plastic skin can form on the envelope surfaces of the stator sheets 2 during overmolding. Only in the area of the sheet recess 3, if formed, the free area is overmolded. The sheet recess 7 also serves as a flow promotor during injection molding and allows a guided and advantageous distribution of the molding material in a targeted manner. At the same time, the assembly mandrel 13 seals the stator 1 inwardly such that no plastic skin can form inside under the polar arms 14 so that the air gap towards the later mounted rotor can be formed as small as possible and no rework is necessary. Furthermore, the assembly mandrel 13 on the side facing the injection point 8 is designed such that a stator recess 7 is simultaneously formed inside centrically facing the injection point 8 during overmolding. Afterwards the overmolded integral coil body is wound optionally directly on the assembly mandrel 13 or by using a separate winding mandrel, on which the coil body has been transferred, by rotating the respective mandrel to form the two stator windings 4. These stator windings 4 are connected with inserted connector pins 12. Winding is continued until the required number of windings has been produced. Before injection, these connector pins 12 are inserted in the cavity of the injection molding tool or in a pin socket formed during overmolding, i.e. the cavity of the injection molding tool is appropriately shaped at this location. Then the metallic stator sleeve 9 is slipped on and the connector boot 11 is mounted to the coil body through the sleeve opening 10 in a suitable manner.

In one embodiment, the two outer stator sheets 2 are circumferentially offset by 15° relative to the inner ones, which are arranged directly back-to-back, and the bent polar arms 14 are sawtooth-shaped, this results in a twelve-pole linear stepper motor.

In another embodiment, if the two stator sheets 2 are circumferentially offset by 7.5° relative to the inner ones, which are arranged directly back-to-back, and the bent polar arms 14 are preferably narrow, lance-shaped, this results in a 24-pole linear stepper motor.

In order to positively influence the flow behaviour of the plastic material in the injection molding tool during overmolding and insert-molding (for example shorter injection time) of the stator for a linear stepper motor, additional axial recesses and/or boreholes can be arranged in the stator sheets 2. These additional flow promotors provide for a more uniform targeted distribution of the injection molding material and also improve the dimensional precision of the whole coil body after stator overmolding.

Similar effects with the same advantages can be reached if in a stator of a linear stepper motor, one or more stator sheets 2 are formed with different wall thicknesses.

To reliably exclude the polar arms 14 lifting off the assembly mandrel 13, it is advantageous that the ends of the polar arms 14 of the stator sheets 2 have slanted faces or the whole edges of the polar arms 14 are slanted. This means, that the polar arms 14 have a larger surface pointing inwards to the assembly mandrel 13 (e.g. to the air gap) than the surface pointing outwards towards the coil windings. The result is that the polar arms 14 cannot relax back towards the inside and the air gap remains constant, which makes that the actuating force cannot change.

For reasons of cost it makes sense to form all stator sheets 2 of the stator for a linear stepper motor identically so that only one type of tool needs to be manufactured for making the stator sheets.

In the manufacture of the stator for a linear stepper motor, it is particularly advantageous if the injection point 8 for the stator overmold 6 is exactly centrical and also faces towards the stator recess 7. This results in uniform filling of the cavity in the injection molding tool while flow behaviour is optimised, allowing the dimensional precision to be improved.

Although the stator for the linear stepper motor has fewer components than previously known, it is maintenance-free. It meets the high requirements of dimensional precision and can be manufactured easily and fast in very large quantities. At the same time this embodiment allows a maximum number of coil windings to be wound on the coil body, allowing the actuating force of the motor to be increased. Previously used additional ball or plain bearings are eliminated, which avoids the wobbling of a later mounted rotor caused by them. This makes it possible to further reduce manufacturing complexity significantly.

DETAILED DESCRIPTION

Embodiments of the present disclosure will be described in detail in conjunction with the drawings. It should be noted that the figures are illustrative rather than limiting. The figures are not drawn to scale, do not illustrate every aspect of the described embodiments, and do not limit the scope of the present disclosure.

Figure 1:
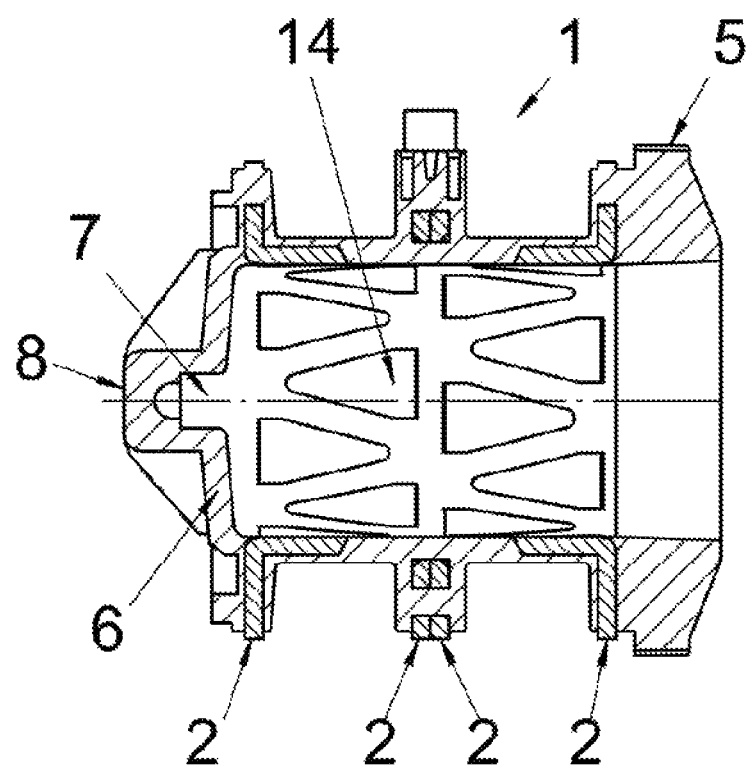
FIG. 1 is a sectional view of a linear stepper motor.
Figure 5:
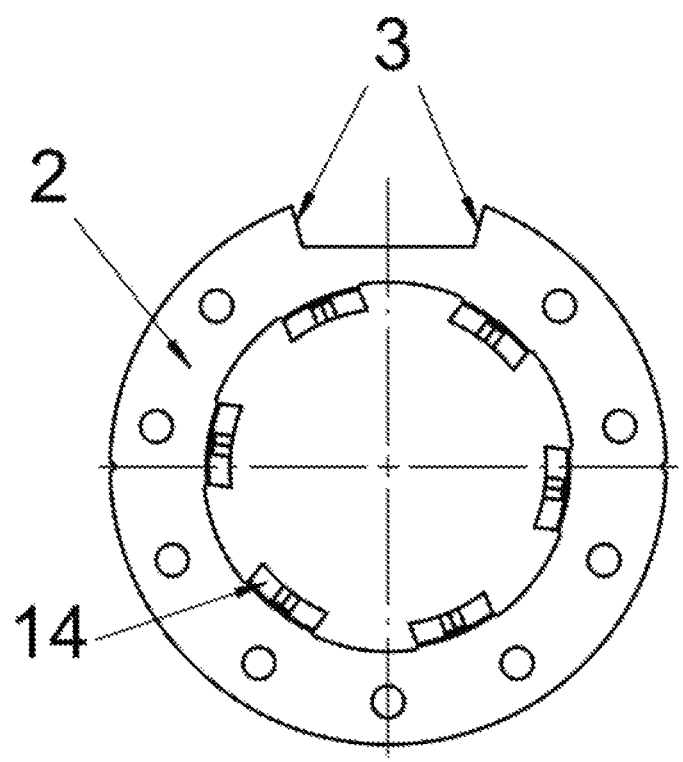
FIG. 5 is a planar view of a stator sheet with a sheet recess.

In one embodiment, the stator 1 in FIG. 1 includes four stator sheets 2, including two outer stator sheets 2 circumferentially offset by 15° relative to the two middle stator sheets 2, are arranged and press-fitted on an assembly mandrel 13. As can be seen in FIG. 5, the four stator sheets 2 each have six polar arms 14 and nine axial boreholes are arranged as additional cut-outs arranged around a central axis thereof to act as flow promotors for the injection molding material, which improves the overall dimensional precision of the coil body. The loaded assembly mandrel 13 (not shown) is then placed in an injection molding tool (not shown) whose inner diameter correlates with the outer diameter of the stator sheets 2.

Figure 2:
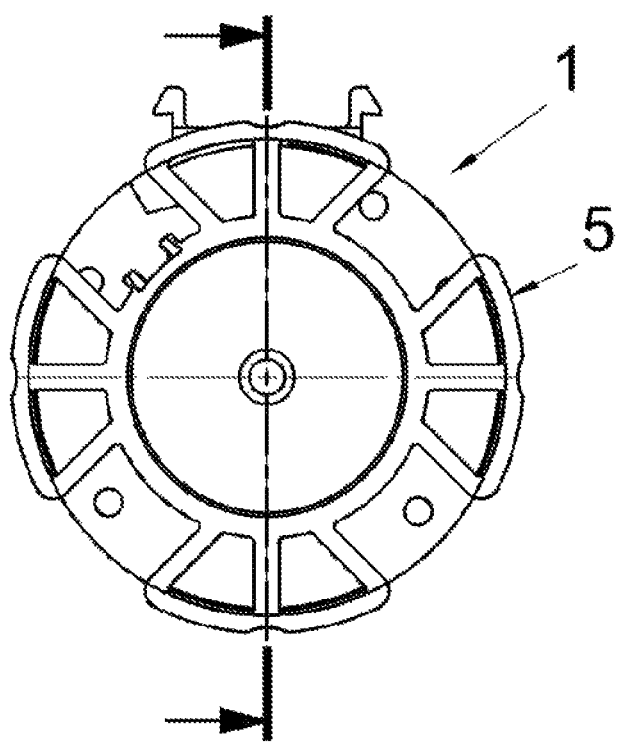
FIG. 2 shows a side view of a stator flange 5.

By placing them, the stator sheets 2 are axially sealed on the front and rear sides by annular recesses in the cavity of the injection molding tool. This is done by circumferential grooves arranged in the injection molding tool. The width of each groove matches the thickness of a corresponding stator sheet 2 and the stator sheets 2 protrude into the grooves during the injection molding process. At the same time, the assembly mandrel 13 seals the stator 1 inwardly such that no injection molding material can penetrate under the polar arms 14. On the side facing the injection point 8, the assembly mandrel 13 is designed such that a stator recess 7 is simultaneously formed inside centrally facing the injection point 8 during overmolding. Overmolding results in the stator overmold 6. The cavity is formed in such a way that the stator flange 5 is simultaneously formed during overmolding. This creates a flexurally rigid integral coil body with integrally molded reinforcing ribs (which also serve for the flow distribution during injection), which can subsequently be wound. The molded coil body is wound by turning the mandrel, either by means of the assembly mandrel 13 or by using a separate winding mandrel, to form the two stator windings 4. Their ends are connected with connector pins 12 inserted in the stator overmold 6. Subsequently, the stator sleeve 9 is slipped onto the wound coil body and suitably fixed. Then the connector boot 11 is positively connected with the stator overmold 6 through the sleeve opening. FIG. 2 shows a side view of the stator flange 5. The stator flange 5 is not continuously closed in the radial circumference, so that a rotor flange can be plugged onto it to be held and positioned in a rotation-locked manner.

Figure 3:
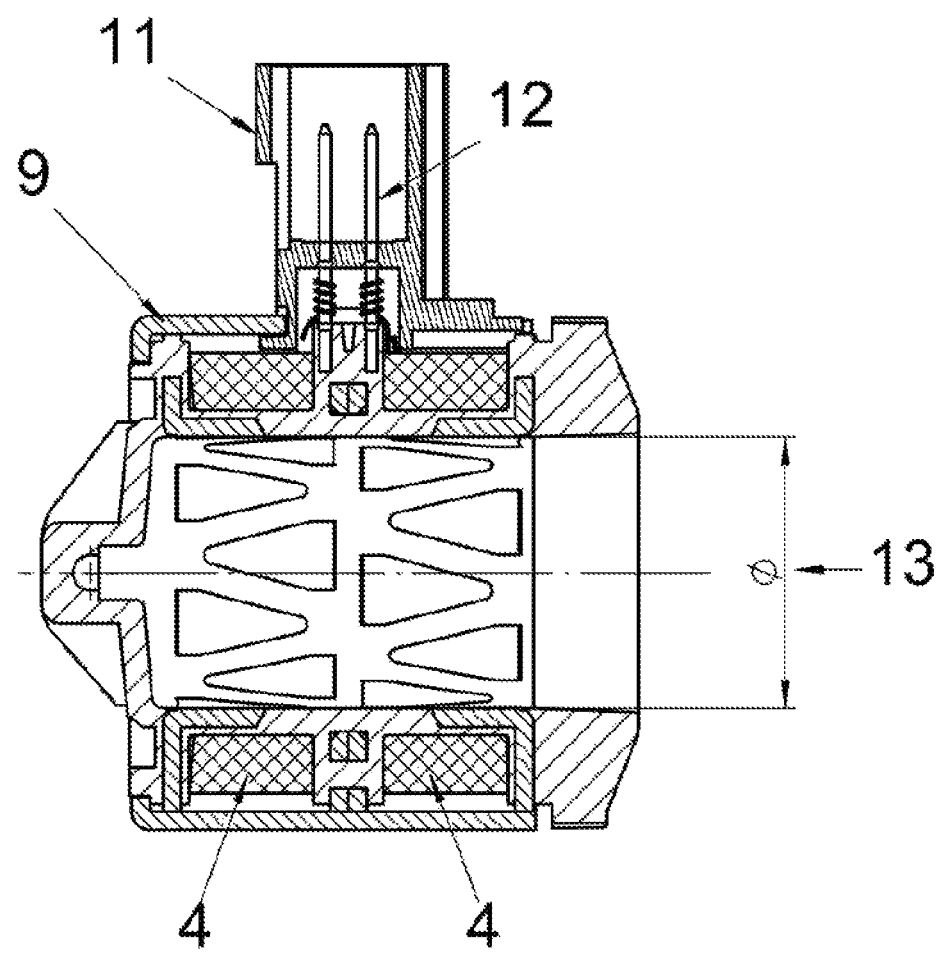
FIG. 3 is a sectional view of a completely assembled stator 1.

FIG. 3 shows a sectional view of a completely assembled stator 1 in its entirety with the stator coils 4 wound on the coil body, slipped-on stator sleeve 9, inserted and connected connector pins 12 and the clicked-on connector boot 12. It also shows in principle, from which side the assembly mandrel 13 is arranged in the stator body as an auxiliary device during manufacture. Its shape conforms to the required inner contour of the stator overmold 6.

Figure 4:
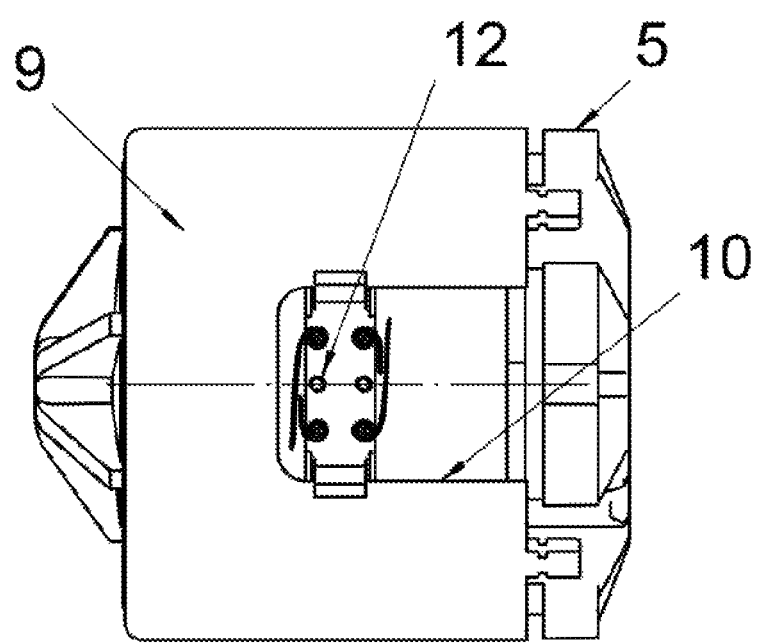
FIG. 4 is a top view of a stator 1.

FIG. 4 shows a top view of a stator 1 with the openings for the insertable connector pins 12 without the mounted connector boot 11 and the shape and size of the sleeve opening 10.

FIG. 5 shows an exemplary stator sheet 2 with an advantageous sheet recess 3 in an axial top view with the angled polar arms 14 and the additional produced openings (here boreholes) to improve flow behavior. The sheet recess 3 is used to position the stator sheets 2 when they are stacked on the assembly mandrel. Through these sheet recesses 3, the injection molding material is favorably distributed in the injection molding tool in a targeted manner so that the stator sheets 2 and polar arms 14 are not deformed by unfavorable pressure conditions or cannot change their position relative to each other. This helps to maintain the dimensional precision of the coil body.

The invention claimed is:

1. A stator for a linear stepper motor, the stator comprising at least four stator sheets and at least one stator winding; the at least four stator sheets being oriented towards each other and provided with bent polar arms;
the at least four stator sheets comprising at least two inner stator sheets each defining a sheet recess and outer stator sheets that are arranged in an offset manner;
all of the at least four stator sheets being joined into an integral coil body by a stator overmold;
one of the at least one stator winding being wound onto the coil body between one inner stator sheet and one outer stator sheet and connected with connector pins;
the at least four stator sheets and the stator overmold including a stator flange and a pin socket are integrally formed such that radial envelope surfaces of the at least four stator sheets are free from the stator overmold;
a stator recess inside the stator being arranged centrically in the stator overmold;
the stator overmold being enclosed by a metallic stator sleeve such that the metallic stator sleeve forms a magnetic return path together with the stator sheets; and
a sleeve opening being formed in the stator sleeve, through which a connector boot is fitted and connected with the stator overmold and/or the metallic stator sleeve and connector pins are arranged.

2. A method for manufacturing a stator according to claim 1 by using an assembly mandrel, an injection molding tool and a winding device, the method comprising:
press-fitting the at least four stator sheets on the assembly mandrel in an offset arrangement relative to each other, wherein the stator sheets are permanently fixed by press-fitting the polar arms on the assembly mandrel;
placing the loaded assembly mandrel in the injection molding tool whose inner diameter correlates with an outer diameter of the stator sheets, with the stator sheets being axially sealed on a front side and a rear side in the injection molding tool by circumferential grooves arranged in the injection molding tool, whose width is matched with a thickness of the stator sheets and into which the stator sheets protrude during the injection molding process, wherein the assembly mandrel seals the stator inwardly, and on a side facing an injection point for the stator overmold, the assembly mandrel is designed such that a stator recess is simultaneously formed centrically inside;
the overmolded integral coil body being wound by using the assembly mandrel or a separate winding mandrel by rotating the mandrel to place the stator winding, which is then connected with inserted connector pins; and
fitting the stator sleeve and the connector boot.

3. The stator for a linear stepper motor according to claim 1, wherein the outer stator sheets are offset by 15° relative to the inner stator sheets, the inner stator sheets are arranged directly back-to-back, and the bent polar arms are sawtooth-shaped.

4. The stator for a linear stepper motor according to claim 1, wherein the outer stator sheets are offset by 7.5° relative to the inner stator sheets, the inner stator sheets are arranged directly back-to-back, and the bent polar arms are narrow lance-shaped.

5. The stator for a linear stepper motor according to claim 1, wherein additional recesses and/or boreholes are arranged in the stator sheets, acting as flow promotors for optimal and fast distribution in the stator overmold.

6. The stator for a linear stepper motor according to claim 1, wherein one or more of the stator sheets are formed with different wall thicknesses.

7. The stator for a linear stepper motor according to claim 1, wherein ends of the polar arms have slanted faces or edges of the polar arms are slanted.

8. The stator for a linear stepper motor according to claim 1, wherein all of the stator sheets are shaped identically.

9. The stator for a linear stepper motor according to claim 1, wherein an injection point for the stator overmold and the stator recess face each other centrically.

\* \* \* \* \*